P. & B. DE MATTIA.
VULCANIZING PRESS.
APPLICATION FILED JAN. 22, 1916.
1,287,256.
Patented Dec. 10, 1918.
2 SHEETS—SHEET 1.
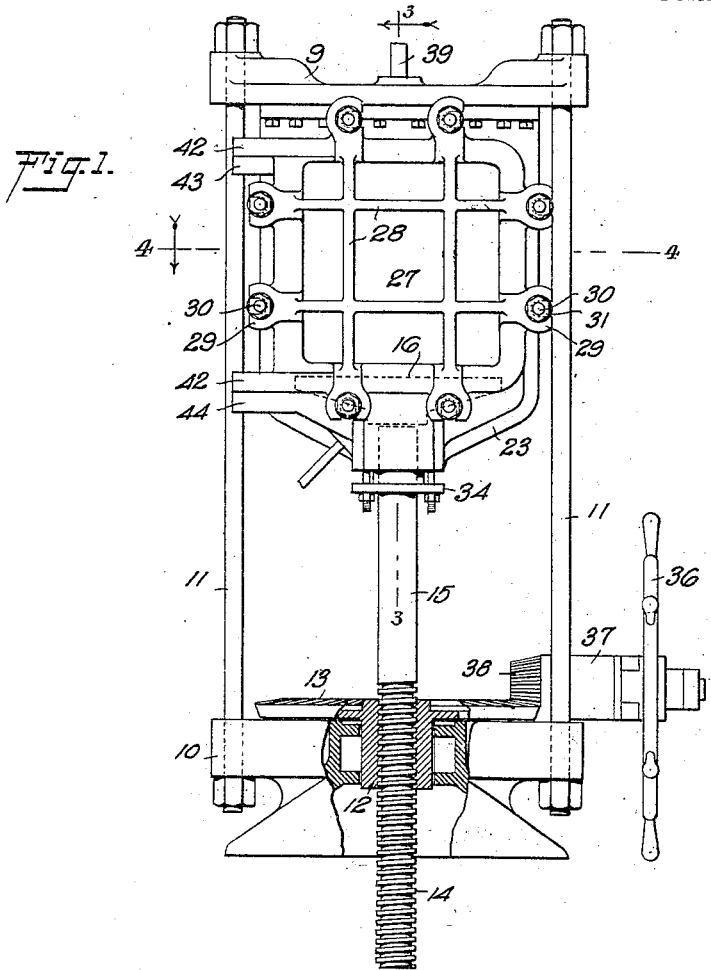
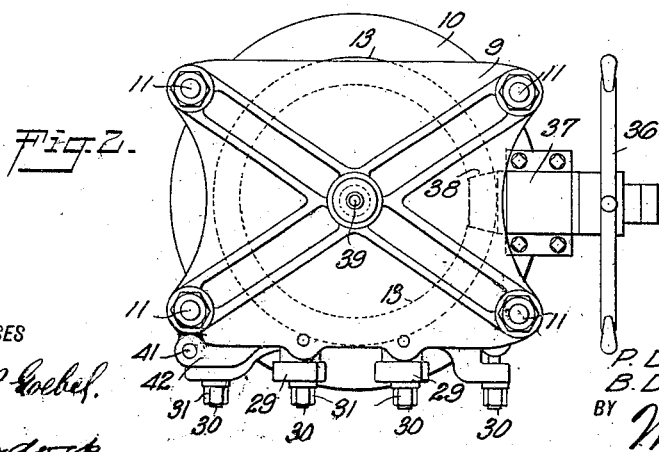

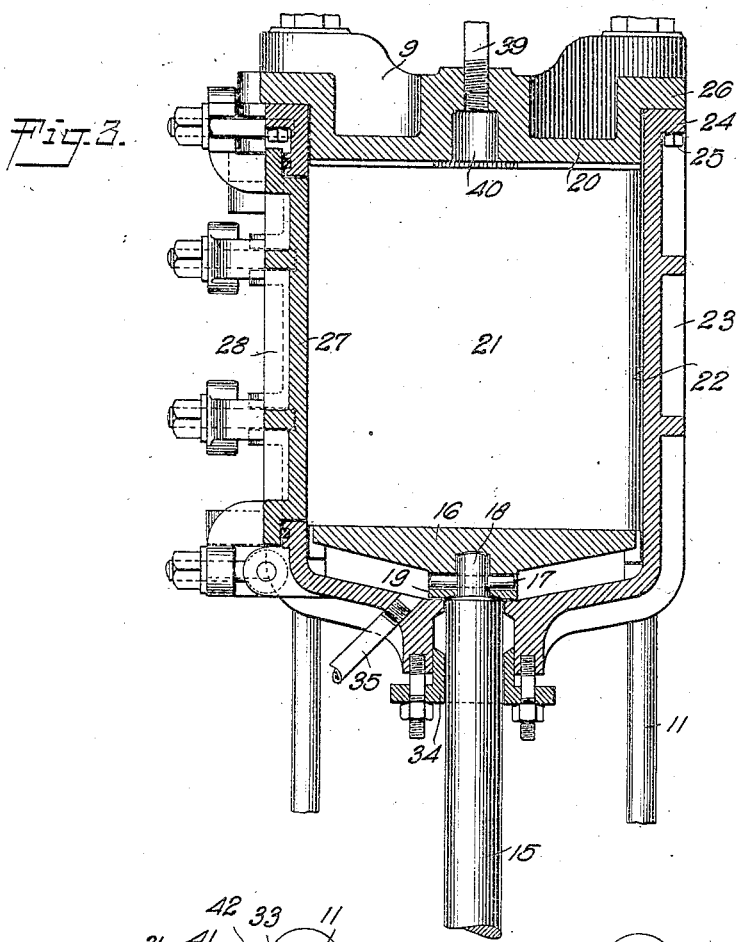
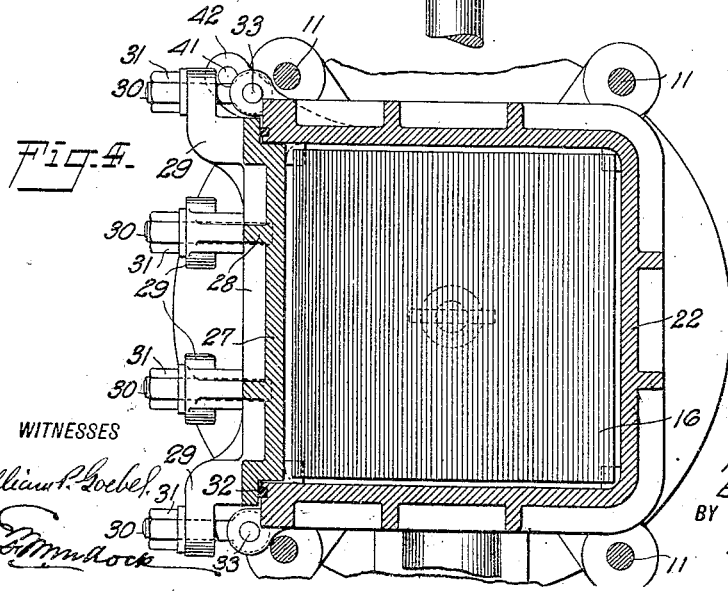

UNITED STATES PATENT OFFICE.

PETER DE MATTIA AND BARTHOLD DE MATTIA, OF CLIFTON, NEW JERSEY.

VULCANIZING-PRESS.

1,287,256.

Specification of Letters Patent.

Patented Dec. 10, 1918.

Application filed January 22, 1916. Serial No. 73,686.

*To all whom it may concern:*

Be it known that we, PETER DE MATTIA and BARTHOLD DE MATTIA, both citizens of the United States, and residents of Clifton, in the county of Passaic and State of New Jersey, have invented a new and Improved Vulcanizing-Press, of which the following is a full, clear, and exact description.

Among the principal objects which the present invention has in view are: to provide heat-retaining means for surrounding molds used in vulcanizing rubber articles; to provide a press of the character mentioned with a chamber for preventing the radiation of heat from the edges of the molds and articles contained therein; to provide means for applying an expansive heating medium to the molds and articles contained therein while being treated; to provide a simple, durable and efficient cabinet and full-opening door therefor; and to provide a cross head having a cabinet suspended therefrom.

*Drawings.*

Figure 1 is a side elevation of a press constructed and arranged in accordance with the present invention, the lower portion of said figure being partly cut away in section;

Fig. 2 is a top plan view of the same;

Fig. 3 is a vertical section taken as on the line 3—3 in Fig. 1, the view being shown on an enlarged scale;

Fig. 4 is a horizontal section on the same scale, and taken as on the line 4—4 in Fig. 1.

*Description.*

As seen in the drawings, a cross head 9 is supported by a base 10 employing for this purpose stanchion rods 11. The base 10 is centrally perforated to form a bearing for the hub 12 of a bevel nut wheel 13. The hub 12 of the wheel 13 is adapted to form therein an internal thread to register with the thread of the screw section 14 of the plunger 15. Mounted on the end of the plunger 15 is a platform platen 16. The union between the platen 16 and the plunger 15 is made flexible, and employs a pin 17 extended through a tip 18 at the end of said plunger; and a boss 19 pendent therefrom.

The element with which the platen 16 coöperates, is a plate 20. The plate 20 is integrally formed with the cross head 9, and forms, when coöperating with the platen 16, one of the two abutments between which the molds are pressed.

In the present invention, the plate 20 forms the top of a chamber 21, the side and bottom walls whereof are formed by the solid walled frame 22. The walls of the frame 22 are suitably reinforced by webs 23. The frame is also provided with a bolting flange 24, through which the bolts 25 extend to engage the flange 26 of the cross head 9. When the bolts 25 are driven home, the frame 23 is suspended from the cross head 9, and together with the plate 20 of the said cross head, forms the chamber 21, which is closed in service by the door 27. The door 27 is provided with hinge brackets 42, which are pivotally connected by means of hinge pins 41, with brackets 43 set out from the frame 22, as shown best in Fig. 1 of the drawings. The door 27 is reinforced by webs 28, at the ends whereof are constructed brackets 29, perforated or slotted to receive the swing bolts 30, carrying the nuts 31.

When the bolts 30 are thrown into position to engage the slots in the brackets 29 and the nuts 31 are tightened thereon, the door 27 is forced hard against the packing 32 to render the chamber 21 steam tight. When it is desired to open the door, the nuts 31 are released from engagement with the brackets 29 and the bolts 30 are swung back, turning for this purpose on the pivot pins 33, until the bolts and nuts carried thereby are clear of the door 27, which may then be opened.

To render the chamber 21 steam tight, the opening in the bottom thereof, through which the plunger 15 passes, is protected by a suitable packing and gland 34 of conventional form and structure. This packing prevents the escapement of steam delivered by the pipe 39, from the chamber 21. The pipe 39 may be connected with any suitable source of heating medium supply. While we may employ any suitable medium, that which is preferred and commonly used when vulcanizing rubber, is steam.

*Operation.*

It will be understood that the molds in which the articles to be vulcanized are disposed, are placed in the chamber 21 preliminary to heating the chamber. The molds are disposed on the platform platen 16 until the chamber 21 is wholly or partially filled. The platen 16 is elevated to force in closer contact, the metals molds and parts thereof. The elevation of the platen is effected by manipulating the hand wheel 36, which is fixed to a shaft mounted in the bearings 37, and which has at the inner end thereof, a bevel pinion 38; the teeth whereon mesh with the teeth on the wheel 13. Then the hand wheel 36 is turned, and wheel 13 and threaded hub 12 is rotated to lift the screw-threaded portion 14 and shaft of the plunger 15, together with the platen 16 supported thereby. Pipe 35 is used to discharge any steam or water that may remain in chamber 21.

The platen 16 is elevated until the molds and the parts of the molds within the chamber 21 are firmly forced together. The door 27 is then closed. The bolts 30 and the nuts 31 carried thereby are swung into place and the door 27 is firmly locked by manipulating the nuts 31. The heating medium is then introduced by way of the pipe 39 and the heat of the chamber 21 is raised to the required degree. It will be noted that by reason of the surrounding wall of the frame 22 and the door 27, direct radiation from the said molds is avoided, with the consequence that the heat is maintained uniform until the vulcanizing is completely effected.

Pipe 35 has a controlling valve of conventional make, and is directly connected with the chamber 21 and with a steam trap, so that when said valve is opened, uniform heat may be maintained in said chamber. When vulcanizing is completed, steam is shut off. Water is then allowed to flow into chamber 21. This will be continued until the molds in the chamber 21 are cooled sufficiently to be handled. The flow of water is then shut off. After the molds are cooled, the water is discharged from chamber 21 by opening the pipe 35. Door 27 is then opened, and swung back on the hinge pins 41, allowing the molds to be extracted.

Claims.

1. A press as characterized comprising a frame embodying a base, a cross head and stanchion rods operatively uniting said base and cross head; a cabinet permanently secured to said cross head in supported relation thereto; a platen forming the bottom of said cabinet and movably mounted therein to coöperate with the cross head; a plunger operatively connected with said platen to move the same toward and away from said cross head, said plunger having a lower threaded section extending through said base; a watertight bearing for said plunger in the lower wall of said cabinet; a gear toothed nut wheel, said wheel having a threaded central passage for engaging the threaded section of said plunger; and manually controlled means for rotating said nut wheel.

2. A press as characterized comprising a frame embodying a base, a cross head and stanchion rods operatively uniting said base and cross head; a cabinet permanently secured to said cross head in supported relation thereto; a platen forming the bottom of said cabinet and movably mounted therein to coöperate with the cross head; a plunger operatively connected with said platen to move the same toward and away from said cross head, said plunger having a lower threaded section extending through said base; a watertight bearing for said plunger and the lower wall of said cabinet; a bevel gear nut wheel rotatively mounted in said base, said gear wheel having a tapped threaded central opening for elevating and depressing said plunger; a hand wheel having a shaft rotatively mounted in bearings formed on said base, said hand wheel being disposed at the outside of said frame; and a bevel gear mounted on said shaft to turn therewith for rotating said nut wheel.

In testimony whereof we have signed our names to this specification in the presence of two subscribing witnesses.

PETER DE MATTIA.
BARTHOLD DE MATTIA.

Witnesses:
GEORGE E. HOCKETT,
MARY BURKHARDT.